United States Patent [19]
Reed

[11] 3,712,268
[45] Jan. 23, 1973

[54] PORTABLE BACTERIOLOGICAL INCUBATOR

[76] Inventor: Jack P. Reed, 2-808 Borinquen Towers, San Juan, P.R.

[22] Filed: June 2, 1971

[21] Appl. No.: 149,279

[52] U.S. Cl. ..................................119/37, 219/385
[51] Int. Cl.....A01k 41/00, A01k 41/02, F27d 11/02
[58] Field of Search .........119/37; 219/385, 407, 406

[56] References Cited

UNITED STATES PATENTS

| 3,553,426 | 1/1971 | Fink | 219/406 |
| 3,584,927 | 6/1971 | Ott | 119/37 X |
| 3,376,405 | 4/1968 | Grower | 219/385 |
| 3,584,605 | 6/1971 | Schwartz | 119/37 |

*Primary Examiner*—Aldrich F. Medbery
*Attorney*—Ernest S. Cohen and Albert A. Kashinski

[57] ABSTRACT

A portable incubator with two independent compartments for regulating the temperature and humidity of bacteriological and biochemical specimens. Simultaneous heating and cooling enables variable incubation temperature control over a wide range of outside ambient temperatures. Simplified solid-state circuitry provides stable operation within precision temperature limits.

11 Claims, 4 Drawing Figures

PATENTED JAN 23 1973

INVENTOR
JACK P. REED

BY Ernest S. Cohen
Albert C. Pavlinski
ATTORNEYS

INVENTOR
JACK P. REED

PORTABLE BACTERIOLOGICAL INCUBATOR

BACKGROUND OF THE INVENTION

For monitoring water pollution, bacteriological and biochemical comtamination is measured by incubating water samples in temperature and humidity controlled environments. Precision specifications for accurate incubation are defined in *Standard Methods for the Examination of Water and Wastewater*, published by the American Public Health Association, Inc. Prior attempts to comply with these specifications have been either limited in application or unnecessarily complicated. To overcome these deficiencies of the prior art, my invention was made.

SUMMARY OF THE INVENTION

My invention is a portable incubator with two independent compartments for regulating the temperature and humidity of bacteriological and biochemical specimens. Simultaneous heating and cooling of each compartment enables variable incubation temperature control over a wide range of outside ambient temperatures. Using a single, continuously operating heat pump, heat is removed to cool the two compartments. At the same time electrical heaters add sufficient heat to raise the compartments to the desired incubation temperatures. Both cooling and heating intensity are adjustable for each compartment, so that operation of the incubator over a wide range of incubation temperatures is independent of outside ambient temperatures.

Variable cooling of two independent compartments with a single heat pump is achieved by varying the relative sizes of heat transfer plates within the compartments. Using a fixed mass transfer plate in the cooler compartment, the plate in the warmer compartment is adjusted to produce proportionally less cooling capacity, depending upon the relative incubation temperatures desired. In continuous steady-state operation, sufficient heat is then removed to lower each compartment below the incubation temperature. Since only a single refrigeration unit is employed, maintenance and operation are simplified.

Variable heating in each compartment is achieved by electrical resistance heaters controlled by independent proportional control circuits. In response to temperature variations, each proportional circuit varies the heating current to maintain the incubation temperature at a precision set-point with only minimal deviations. The heaters are designed for operation in both air and water baths, and include integral air-lift water-circulating pumps to insure uniform temperature distribution. The compressed air for operating the pumps is also available for water aeration and incubation atmosphere renewal when necessary. To obviate thermal stabilization circuitry, the proportional control circuits are located in the inherently temperature stable incubation compartments. Again, maintenance and operation are simplified without loss of incubating capability or versatility.

Therefore, one object of my invention is an incubator for performing simultaneous incubations under diverse temperature and humidity conditions.

Another object of my invention is a dual incubator using a single refrigeration unit for differential cooling.

Another object of my invention is an incubator with precision electronic temperature control.

Another object of my invention is an incubator with integral water circulating and aerating capacity.

These and other objects of my invention are apparent in the following specification and drawing.

DESCRIPTION OF THE PREFERRED EMBODIMENT

Figure 1:
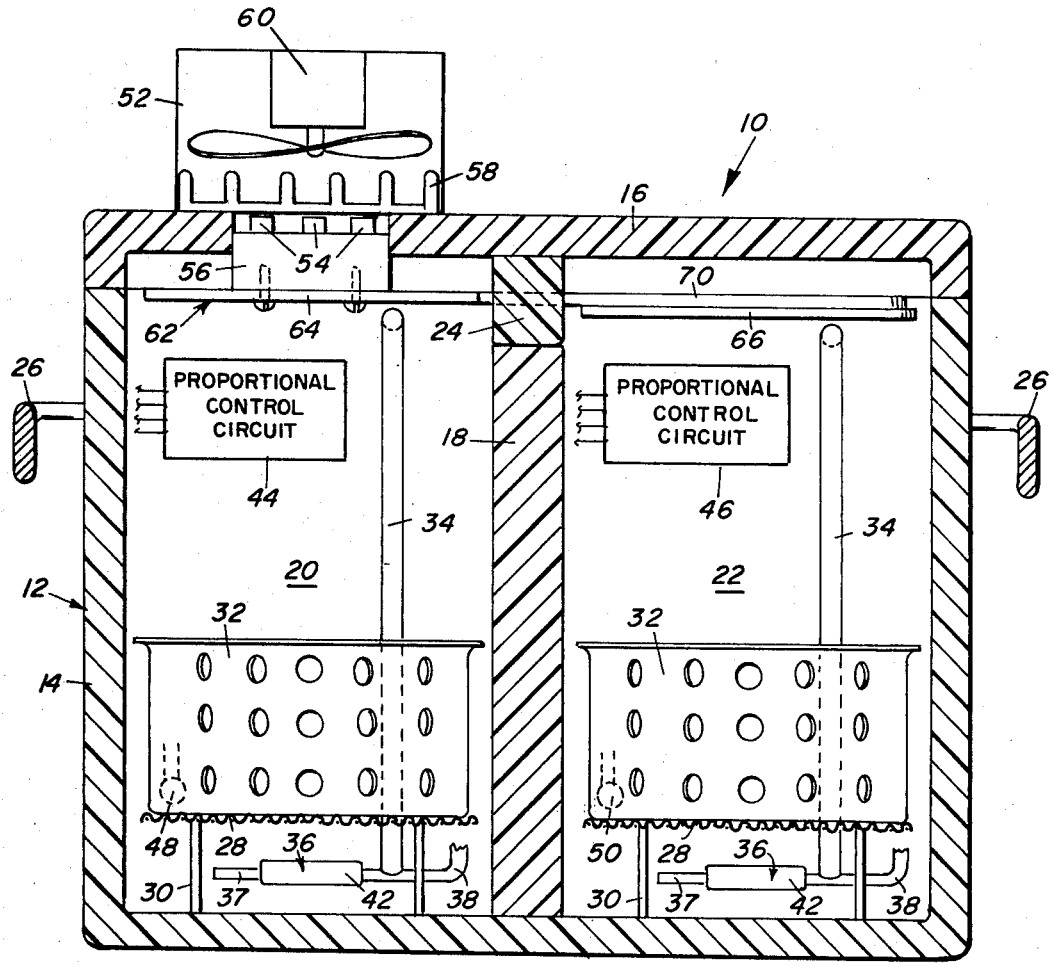

A portable bacteriological and biochemical incubator 10 is shown in vertical cross-section in FIG. 1. Basically, the incubator consists of an insulated outer shell 12, on which heating, cooling, and control mechanisms are mounted. Outer shell 12 is a deep, watertight container 14 with a close-fitting mated lid 16. An ordinary Styrofoam picnic cooler is suitable. A removable, watertight, thermal barrier 18 divides container 14 into two atmospherically independent compartments 20 and 22. Extending across the inside of lid 16, a similar removable thermal barrier 24 provides complete isolation of the two compartments when the outer shell is assembled. On the outside of container 14, handles 26 are convenient for carrying the portable incubator from place to place.

Inside each compartment 20 and 22 a perforated horizontal platform 28 is spaced from the bottom of container 12 and supported by vertical legs 30. During incubation, specimens are supported on the platforms in perforated sample baskets 32. Depending upon the nature of the specimen and the incubation procedure employed, the individual sample baskets are immersed in temperature controlled baths of either air or water, circulating independently within the compartments.

Figure 2:
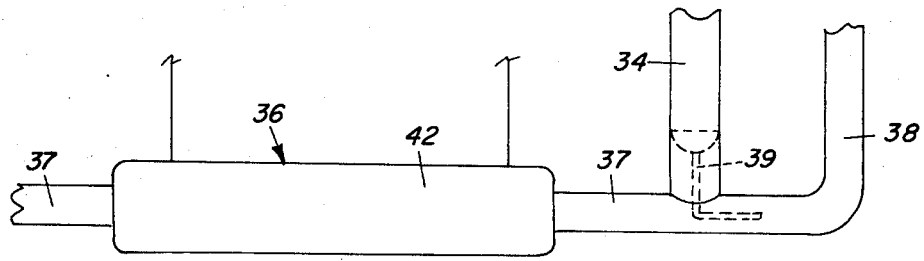

Pressurized air for circulating both air and water is introduced into compartments 20 and 22 through hollow tubes 34, terminating at air-lift pumps 36. Each pump consists of an open horizontal intake tube 37 with a vertical elbow 38 at one end. At the junction of tubes 34 and 37 a nozzle 39, pointed in the direction of elbow 38 as shown in FIG. 2, constricts the flow of air into tube 37, raising the velocity with a venture effect. When the pump is immersed in water (not shown), the venturi effect draws water through tube 37 while the air simultaneously lowers the water density within the tube. More dense water enters the water inlet of the tube, displacing the less dense upward through elbow 40. To heat the circulating air or water a waterproof resistance heater 42 is wound on each input tube. When heating incoming air, the outlet of elbow 40 is plugged to direct the flow directly through input tube 38 and heater 42.

Temperature levels within incubator 10 are controlled by two proportional control circuits 44-46, with one circuit located in each compartment as shown in FIG. 1. In response to temperature variations sensed by two thermistors 48-50, positioned near the incubation sample containers, the control cirucits vary the output of heaters 42. To permit incubation below ambient temperature, the compartments are continuously refrigerated by a thermoelectric cooler 52, mounted on lid 16.

Heat is pumped from the incubator by cooler 52 using commercially available, direct current thermoelectric modules 54 that produce Peltier cooling on the outside surface of a metallic cold bar 56. Above the thermoelectric modules a heat sink 58 and electric fan 60 dissipate the removed heat. On the opposite inside surface of the cold bar a flat heat transfer plate 62 is mounted, as seen most clearly in FIG. 3. The transfer plate absorbs heat from the incubator environment for removal by the thermoelectric cooler.

Figure 3:
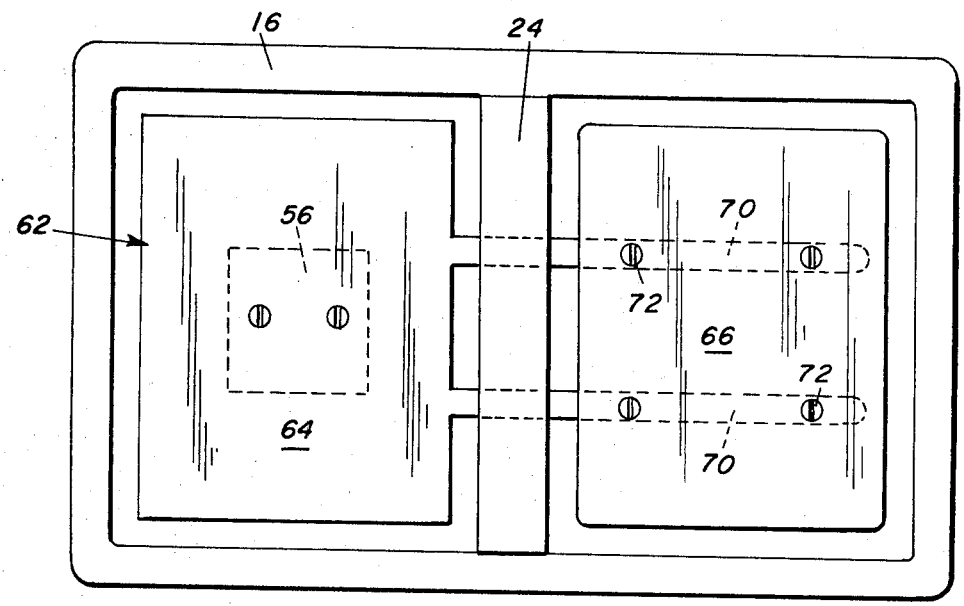

As seen in FIG. 3, the transfer plate consists of two rectangular sections 64 and 66, thermally interconnected by two parallel arms 68 and 70 extending through thermal barrier 24. Differential cooling of the two incubator compartments is possible by varying the mass and geometry of plate section 66. For easy substitution, screws 72 hold removable section 62 in thermal contact with arms 68 and 70. When plate section 66 is smaller than section 64, proportionally less heat is removed from compartment 22 than from compartment 20, permitting simultaneous incubation at two different below-ambient temperatures.

Figure 4:
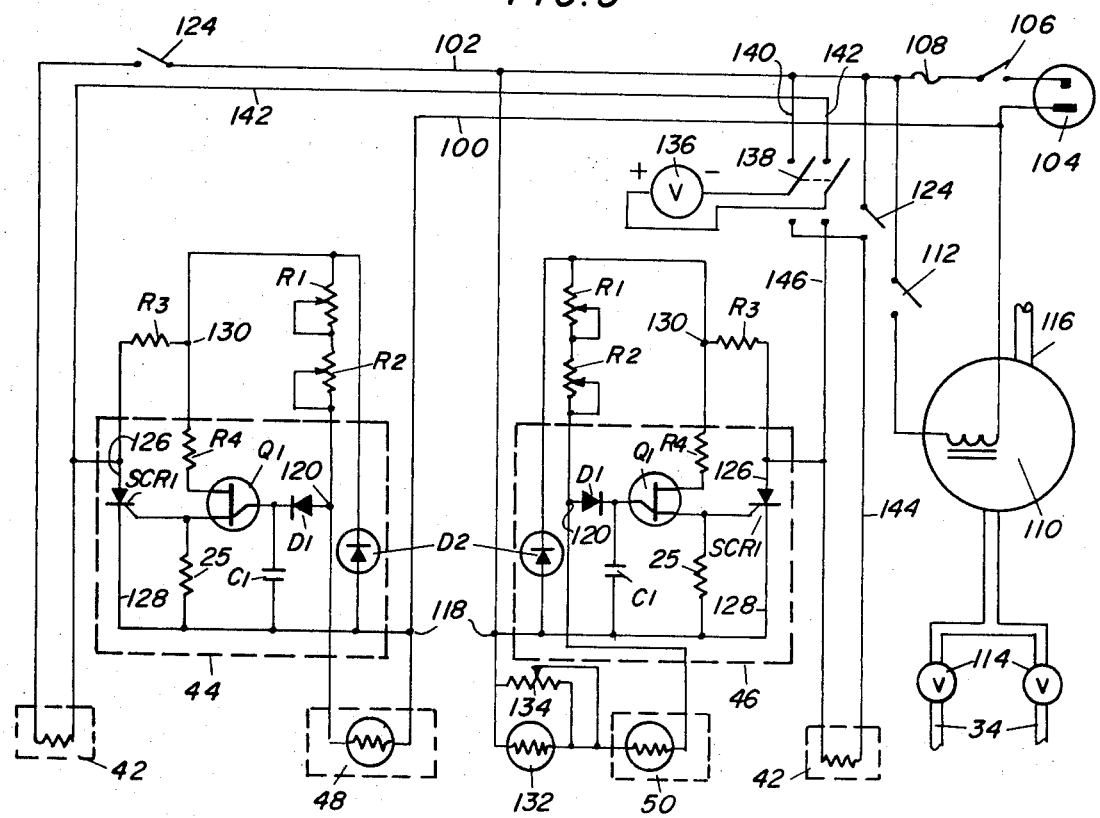

With thermoelectric cooler 52 continuously pumping heat from the incubator compartments 20 and 22, precise temperature levels are maintained by adding controlled amounts of heat through heating coils 42. A schematic diagram of the proportional heat control circuits 44 and 46 that regulate the coils is shown in FIG. 4 along with auxiliary electronic equipment. Operating voltage across two source conductors 100 and 102 is derived from an a.c. voltage source through a two conductor plug 104, an on-off switch 106 and a fuse 108. A polarized plug is used to preserve the polarity of residual d.c. bias that arises from mobile operation with a d.c.-a.c. inverter (not shown). Pressurized air for pumps 36 is supplied by an electric air pump 110, connected to conductors 100 and 102 through an on-off switch 112. On the outer side the pump feeds supply tubes 34 through indentical control valves 114. On the inlet side, an inlet supply tube 116 either ingests fresh air, or recycles incubated air, depending upon the desired mode of operation.

Proportional control circuits 44 and 46 for regulating heaters 42 are shown enclosed by dotted rectangles in FIG. 4. Each circuit is essentially similar. Basically, power input to the heaters is regulated by a silicon controlled rectifier $SCR_1$ fired by a unjunction transistor $Q_1$ connected in a relaxation oscillator configuration. Heating is regulated by the effect of incubation temperature variations upon the thermistors 48 and 50 in compartments 20 and 22. A temperature decrease increases thermistor resistance, while a temperature increase has the reverse effect.

Referring to proportional circuit 44 for example, thermistor 48 joins conductor 100 at a terminal 118. The other thermistor lead is connected, through a terminal 120 and a diode $D_1$, to the emitter of unjunction transistor $Q_1$. Depending upon the resistance of thermistor 48 at a given instant, the charging time constant of a capacitor $C_1$, in parallel with the thermistor and diode $D_1$, is varied. When the resistance increases in response to a temperature decrease, the time constant decreases. With capacitor charging limited to positive half-cycles by diode $D_1$, capacitor $C_1$ charges once each cycle. When the capacitor reaches the firing potential of unjunction $Q_1$ the unjunction fires, sending a voltage pulse to the gate 122 of $SCR_1$. Through an on-off switch 124, the anode 126 of $SCR_1$ is connected to source conductor 102 in series with heater 42. The cathode 128 of $SCR_1$ is connected to source conductor 100 through terminal 118. Each time the SCR fires during a positive half-cycle, heater 42 is energized. Since a temperature decrease within compartment 20 shortens the charging time of $C_1$, cooler temperatures result in longer conducting periods for $SCR_1$ and proportionally increased heater operation during each half-cycle. Warmer temperatures result in corresponding decreases. Since the increases in heater current are proportional to decreases in incubation temperature, a set equilibrium temperature is maintained.

Specific incubation operating temperatures are set by varying the resistance of a fine and a coarse potentiometer $R_1$ and $R_2$ in series between terminal 120, an intermediate high impedance resistor $R_3$, and $SCR_1$ anode 126. The potentiometers cooperate with thermistor 48 to vary the charging time of capacitor $C_1$. From a terminal 130 between $R_1$ and $R_3$, a base resistor $R_4$ completes the circuit to one base terminal of unjunction $Q_1$. Another resistor $R_5$ completes the circuit from the other base terminal to terminal 118. Between terminal 118 and terminal 130, a zener diode $D_2$ maintains the voltage across $R_1$, $R_2$ and thermistor 48 regardless of line voltage variations.

As stated above, circuits 44 and 46 are essentially similar. One significant difference is the polarity in which they are connected to source conductors 100 and 102. The two proportional circuits 44 and 46 cannot operate in parallel polarity off the same a.c. source because a common ground introduces interference in the phase control function of the thermistors when differential incubation temperatures are employed. However, since each SCR acts as a half-wave rectifier, this difficulty is avoided by reversing the grounds so that the SCR's fire on alternate half-cycles. In this configuration the proportional circuits act as independent units. This feature is particularly important when the power source is a low voltage d.c.-a.c. inverter. To achieve this result, terminal 118 of proportional circuit 46 is connected to source conductor 118, and heater 42 is connected, through on-off switch 124, in series with source conductor 100, reversing the polarity with respect to proportional circuit 44.

Another difference between proportional circuits 44 and 46 is a parallel thermistor 132 and potentiometer 134 connected to terminal 118 in series with thermistor 50. Thermistor 132 is positioned in a control box adjacent to resistor $R_2$ to offset small $R_2$ resistance changes where extreme temperature sensitivity is required during high temperature operations.

Initial temperature setting with proportional circuits 44 and 46 requires precise voltage determination across heaters 42 during adjustment of potentiometers $R_1$ and $R_2$. For this purpose a voltmeter 136 is shunted across the heater of the circuit undergoing adjustment. A double-pole-double-throw switch 138 alternately connects each heater in parallel with meter 136 through conductors 140–146 when this operation is performed.

Like most solid-state devices, proportional control circuits 44 and 46 are temperature sensitive. Electronic temperature stabilization is possible, but complex and expensive. To avoid the difficulties of electronic stabilization the proportional circuit elements, surrounded by dotted lines in FIG. 4, are atmospherically sealed and positioned in the incubated compartments they control. Since the compartments are held within precise temperature limits, the circuits are automatically stabilized regardless of outside ambient temperatures. The remaining circuit elements are mounted in a convenient control box (not shown) outside the incubator.

For different bacteriological and biochemical incubations, various combinations of temperature and humidity are required. My invention is capable of two simultaneous incubations under all combinations of the required conditions, as is illustrated by the following example. To prepare the incubator for low temperature humid-air operation and higher temperature water-bath operation, compartment 20 is filled with water to cover heater 42 and compartment 22 filled with water to cover sample basket 32. Air is fed from pump 110 through air lift pumps 36 to circulate and heat the water in each compartment. After closing lid 16, switches 106, 112 and 124, and thermocooler 52 are turned on. Because compartment 20 is to operate at lower temperature, more cooling capacity is required, so transfer plate 64 is positioned over that compartment. The size of transfer plate 66 is chosen for proportionally suitable cooling capacity, depending upon outside ambient temperatures. Potentiometers $R_1$ and $R_2$ are then adjusted to raise the temperature of each compartment to the desired incubation level. When a thermometer (not shown) in each compartment indicates that the desired temperatures are reached, voltmeter 136 is shunted across the heaters and $R_1$ and $R_2$ adjusted to obtain a heater holding voltage sufficient for steady state operation at the indicated temperature. The incubator is then ready for continuous operation at the indicated temperatures over a wide range of outside ambient temperatures.

While my invention is described by reference to a specific preferred embodiment, substitution and modification by persons of ordinary skill in the art is expected within the basic teachings of this disclosure. For this reason the scope of the invention is limited only by the following claims:

I claim:

1. A constant temperature incubator comprising:
first and second impermeable, insulated, incubation compartments,
refrigeration means, including a refrigeration unit and first and second heat transfer surfaces for continuously removing heat from the compartments,
the relative proportions of the first and second heat transfer surfaces being selected to determine the relative amounts of heat removed from each compartment,
electric heating means for independently adding heat to each compartment,
electric control means for independently regulating the heat added to each compartment in response to deviations from pre-set incubation temperatures.

2. An incubator as claimed in claim 1 in which:
the heating means include an electrical heater integrally formed with an air-operated, fluid pump for simultaneously heating and circulating fluids in the first and second compartments.

3. An incubator as claimed in claim 1 in which:
temperature sensitive circuit elements in the electric control means are located inside at least one of the incubation compartments for thermal stabilization.

4. An incubator as claimed in claim 2 in which:
temperature sensitive circuit elements in the electric control means are located inside at least one of the incubation compartments for thermal stabilization.

5. An incubator as claimed in claim 1 in which:
the first and second heat transfer surfaces include flat metallic plates in thermal contact, and
fasteners for separating one plate from the other and substituting another plate of different relative proportions.

6. An incubator as claimed in claim 1 in which:
the electric control means includes first and second proportional control circuits connected to the same source in opposite electrical polarity to prevent electrical interference to independent regulation.

7. An incubator as claimed in claim 2 in which:
the electric control means includes first and second proportional control circuits connected to the same source in opposite electrical polarity to prevent electrical interference to independent regulation.

8. An incubator as claimed in claim 3 in which:
the electric control means includes first and second proportional control circuits connected to the same source in opposite electrical polarity to prevent electrical interference to independent regulation.

9. An incubator as claimed in claim 4 in which:
the electric control means includes first and second proportional control circuits connected to the same source in opposite electrical polarity to prevent electrical interference to independent regulation.

10. An incubator as claimed in claim 5 in which:
the electric control means includes first and second proportional control circuits connected to the same source in opposite electrical polarity to prevent electrical interference to independent regulation.

11. An incubator as claimed in claim 1 in which the electrical control means for independently regulating the heat added to each compartment includes:
first and second thermo-electric sensing means, and
first and second proportional circuits responsive to the first and second sensing means respectively, for independently regulating the amount of power output to the electric heating means in proportional response to deviations of the compartments from pre-set temperatures, the first and second proportional circuits being connected to a single electrical source in opposite polarity to prevent electrical interference with independent temperature regulation.

* * * * *